United States Patent
Barefoot

[19]

[11] Patent Number: 6,039,240

[45] Date of Patent: Mar. 21, 2000

[54] WELDING BACKPRESSURE CONTROL APPARATUS

[76] Inventor: Byron G. Barefoot, 8432 Quarry Rd., Manassas, Va. 20110

[21] Appl. No.: 09/175,600

[22] Filed: Oct. 20, 1998

[51] Int. Cl.$^7$ .................................................. B23K 9/167
[52] U.S. Cl. ............................................. 228/219; 219/74
[58] Field of Search ..................... 219/74, 60 A, 219/60 R, 61, 136, 160; 228/219

[56] References Cited

U.S. PATENT DOCUMENTS

| | | | |
|---|---|---|---|
| 3,614,378 | 10/1971 | Goodell et al. | 228/219 |
| 4,723,064 | 2/1988 | Bothe, II | 219/160 |
| 5,304,776 | 4/1994 | Buerkel et al. | 219/60 R |
| 5,396,039 | 3/1995 | Chevrel et al. | 219/61 |
| 5,425,492 | 6/1995 | Thode | 228/219 |
| 5,597,109 | 1/1997 | Ohmi et al. | 228/219 |

*Primary Examiner*—Clifford C. Shaw
*Attorney, Agent, or Firm*—Harold H. Dutton, Jr.

[57] ABSTRACT

A backpressure controlling device for welding purge gas comprising a vertically oriented cylindrical housing, a water outlet at the bottom of the housing and a water outlet in the wall of the housing and spaced up from the bottom of the housing, the water outlets defining a water volume space in the housing, a gas inlet tube and a concentric gas outlet tube surrounding the gas inlet tube, the gas inlet tube being adjustably positioned in the housing and having a length such that one end thereof extends below the water inlet and the other end thereof extending out of the housing for connection to a pipeline carrying purge gas, the gas outlet tube being secured to a spacer wall spaced from the upper end of the housing and extending to a point above the water outlet and communicating with the exterior of the housing through openings in the wall of the housing above the spacer wall, the housing being of a size such that the volume of the space above the water inlet is at least about one and one-half times as great as the water volume space, whereby when the water volume space is filled with water, the water is unable to flow out of the gas inlet tube or the gas outlet tube at any position of the housing.

9 Claims, 3 Drawing Sheets

WELDING BACKPRESSURE CONTROL APPARATUS

This invention relates to a welding gas backpressure control device. More particularly, the invention relates to an improved device for maintaining an accurate, low level backpressure in an orbital welding system utilizing an inert purge gas and a water container for maintaining the back pressure of the gas, and enabling high quality, reproducible welds in long lines of piping.

BACKGROUND AND OBJECTS OF THE INVENTION

In my copending U.S. patent application Ser. No. 08/862,481 filed May 23, 1997 now U.S. Pat. No. 5,864,111, I have disclosed a method and device for controlling pipe welding which is particularly useful in the welding of pipes using orbital welding techniques, such as are used in the construction of plants. Such pipes or pipelines run long distances in modern plants, particularly manufacturing plants for electronic components and semiconductors, for carrying a variety of process gases through the plant. In addition, many fabrication shops use such welding apparatus for producing manifolds, headers and fittings involving numerous welds of pipe. Generally the construction of pipelines involve the welding of numerous angles and fittings to stainless steel piping, typically ranging from 3/16 inch up to about 2.5 inch in diameter. Because of the length of the pipelines, the requisite purity of the gases to be conveyed, and the number of welds in a typical pipeline, a very consistent, high quality weld is required. Such welding techniques generally utilize an orbital welding apparatus such as is shown in U.S. Pat. Nos. 5,136,134 and 5,223,686 to Benway, et al. With such an apparatus, the welding electrode orbits around the pipe joint during the welding, while an inert purge gas flows through the pipeline.

Because of the length of the pipeline, and the fact that each weld increases the length of the pipeline and thus the volume of the pipeline, the purge gas flow characteristics change as the pipeline progressively increases in length. Moreover, as a weld is being completed, factors such as gravity and fluctuations in purge gas pressure can affect the quality and uniformity of the weld. For these reasons, controlling the pressure of the inert purge gas through the pipeline during the welding is therefor a very important aspect of the welding process for achieving high quality, uniform welds.

Thus, prior patents such as U.S. Pat. No. 5,396,039 to Chevrel disclose systems for welding pipelines using an orbital welding method with high purity argon as the purging gas flowing through the pipeline. U.S. Pat. No. 5,425,492 to Thode discloses another orbital welding process using an inert gas to protect the weld site from oxidation. This latter patent suggests adjusting the flow rate of the inert gas in response to pressure changes near the weld.

Still another system is disclosed in U.S. Pat. No. 5,304,776 to Buerkel et al, utilizing a continuously variable pressure and vacuum within the pipes of the inert gas flowing through the piping network, the pressure varying according to the position of the orbiting welding electrode. In addition, the spacing between the welding electrode and the molten weld puddle is also varied, in order to compensate for gravitational effects on the molten metal during the welding process.

As discussed in my prior patent application, the pressure and flowrate of the inert gas are two important variables which have a great influence on the quality of the welds produced in orbital welding systems. For example, a given flow rate must be maintained in order to adequately protect the weld site against oxidation. The actual flow rate is a function of several factors, but primarily the size of the pipe being welded. In addition, the pressure of the inert gas must be maintained within narrow limits during the welding. While the flow may be set at the desired rate and will remain essentially constant, control of the pressure is more difficult for several reasons. Since each weld increases the length of the pipeline, the internal volume of the pipeline also increases. In addition, when different lengths of pipe are added to a pipeline, the internal volume of the pipeline again increases. With different diameters of pipe, different volumes are encountered.

In order to maintain a uniform sweeping of a weld site by the purge gas, the flow rate of the purge gas can vary from about 5 cfh (cubic feet per hour) to almost 600 cfh, depending on the size of the pipe, but the gas pressure must stay within a rather narrow, low pressure range of about 1–5 inches of water.

Leakage from the piping network during the welding is also a significant variable which causes variation in the pressure of the purge gas. For example, during the welding some gas is allowed to leak at a butt joint, but as the weld progresses around the pipe, the joint gradually closes, and the leakage gradually diminishes until the weld is completed, at which time the leakage stops. This in turn causes a gradual increase in the pressure in the pipeline.

In the past, in a typical welding setup, to help maintain a constant pressure in the piping network, a restrictor is used at the end of the piping network, remote from the weld, and a sensitive pressure gauge is used to set and monitor the pressure. The gauge is connected to the pipeline downstream of the weld by a T-fitting connection to the pipeline, and the operator monitors changes in the pressure in order to be able to adjust the flow of the purge gas as the monitored pressure changes. Unfortunately, changing of the flow does not occur quickly enough in may cases to compensate for changing pressures. Thus, as a weld progresses around a pipe, the gradual increase in the gas pressure could increase to the point where the weld would "blow out" and cause a rejection of the weld. Even if the weld does not blow out, if the pressure rises sufficiently, the quality of the weld will be reduced.

My prior patent application describes a method and apparatus allowing a very precise control of the purge gas, by causing at least a portion of the flowing purge gas from the pipe to flow through a back pressure regulator which is capable of continuously compensating for back pressure variations in the pipeline, without allowing a pressure buildup or reduction in the pipe during the welding. This is done by means of a T-fitting connection which conducts a portion of the flowing purge gas into a receptacle containing a liquid such as water, in such a way that the purge gas continually bubbles through the water. The height of the liquid column is adjustable to control the back pressure.

The present invention relates to an improved receptacle for use in that process, and for containing the liquid which is used to create the backpressure, and through which the liquid flows.

Because of the high purity required for the welds being produced, the materials, the apparatus, and the techniques used to produce such welds are often kept in "clean rooms" in order to prevent or minimize impurities from getting into the pipelines or the welds. This in turn requires extraordinary care through all stages of the process and with all apparatus in use.

Because the apparatus disclosed in my prior application is a water column, there is always the possibility that the device will be simply tipped, or accidentally knocked over. When this happens, water would be allowed to escape from the receptacle, causing a contamination of the clean room environment. For this reason, great care must be exercised to minimize or avoid spillage. However, preventing even the possibility of leakage is complicated by the fact that the gas bubbling through the water must be free to escape to the atmosphere, and the top of the water column itself must be at atmospheric pressure. If the device were sealed or closed, the problems of prior art welding systems would not be overcome, since pressure would then be allowed to build up in the device, and the back pressure in the pipeline would gradually increase.

Accordingly, a primary object of the present invention is to provide an improved device for regulating the back pressure of a flowing purge gas in an orbital welding system.

Another object of the invention is to provide an improved device for regulating the back pressure which minimizes or prevents leakage from the device in the event that it is knocked or tipped over.

Still a further object of the invention is to provide an improved device for regulating the back pressure of a flowing purge gas, which both provides an adjustable back-pressure and prevents or greatly minimizes leakage or spilling upon tipping over.

Yet a further object of the invention is to provide a relatively spillproof or spill resistant, liquid filled back pressure regulator which is open to the atmosphere at the gas discharge outlet.

DESCRIPTION OF THE INVENTION

The improved device according to the present invention comprises a generally cylindrical housing formed by bottom and side walls. A drain valve or plug in the bottom and a similar overflow valve or plug fitting in the side wall determine the maximum height of the water column within the housing. A gas inlet tube extends from the top of the housing downwardly to a depth below the water level, opening just above the bottom wall of the housing, and immersed into the water to a depth desired. The depth of the immersion determines the backpressure of the water on the gas in the welding system as the inert shield gas bubbles through the water. Ordinarily, the overflow valve or plug is positioned about five inches above the bottom wall of the housing, so that the maximum depth of water in the housing will be about five inches. This, in turn, determines the maximum backpressure on the flowing gas to be a pressure of about five inches of water. Preferably the gas inlet tube is adjustably positioned within a fitting at the top of the housing, such that the depth of immersion of the lower end of the gas inlet tube may be axially adjusted. The deeper the immersion of the lower end of the gas inlet tube into the water in the housing, the greater is the backpressure in the pipeline to which the device is connected. Once the desired back pressure is determined, the position of the gas inlet tube is secured.

A gas outlet tube extends downwardly into the housing, but opens at a position just above the maximum liquid level as determined by the position of the overflow fitting. The gas outlet tube surrounds the gas inlet tube, preferably concentrically. The upper end of the gas outlet tube is open to the atmosphere, and the lower end is open to the space above the liquid in the housing. Thus, purge gas which bubbles through the liquid exits the housing by flowing freely out through the gas outlet tube. A mounting flange for the gas outlet tube also serves as the top wall of the housing, sealingly connected to the side wall and the gas outlet tube. The gas outlet tube is of a fixed length, opening into the interior of the housing a convenient distance above the maximum height of the water (as determined by the overflow fitting). The upper end of the gas outlet tube discharges to the atmospheric air at atmospheric pressure. The length of the gas outlet tube is greater than the depth of the water, such that there is a greater volume in the housing above the lower or inlet end of the gas discharge tube than there is below the level of the overflow fitting. Preferably the volume of the chamber above the lower or inlet end of the gas discharge tube is about one and one-half to two times the volume of liquid contained in the housing.

By virtue of the construction thus described, during the welding process, when the purge gas flows from the pipeline being welded through the gas inlet tube into the housing, where it bubbles through the water in the housing. Of course the water remains in the lower portion of the housing. But in the event that the housing should fall or be knocked over, no or minimal water spillage is likely by virtue of the fact that the water in the housing will at all times be below the level of the central gas outlet tube. If the housing tips to a horizontal position, the water level will not be great enough to reach the level of the gas outlet tube. If the housing is completely inverted, then the water level will still be below the (now) upper end of the gas outlet tube.

In order to remove the water from the housing, when desired, a drain valve or fitting is provided on the bottom of the housing.

DESCRIPTION OF THE DRAWINGS

While the invention has been described above in general terms, it will now be described with reference to the accompanying drawings which show by way of non-limiting example, one preferred embodiment of the invention, and in which.

DETAILED DESCRIPTION OF PREFERRED EMBODIMENT

Figure 1:
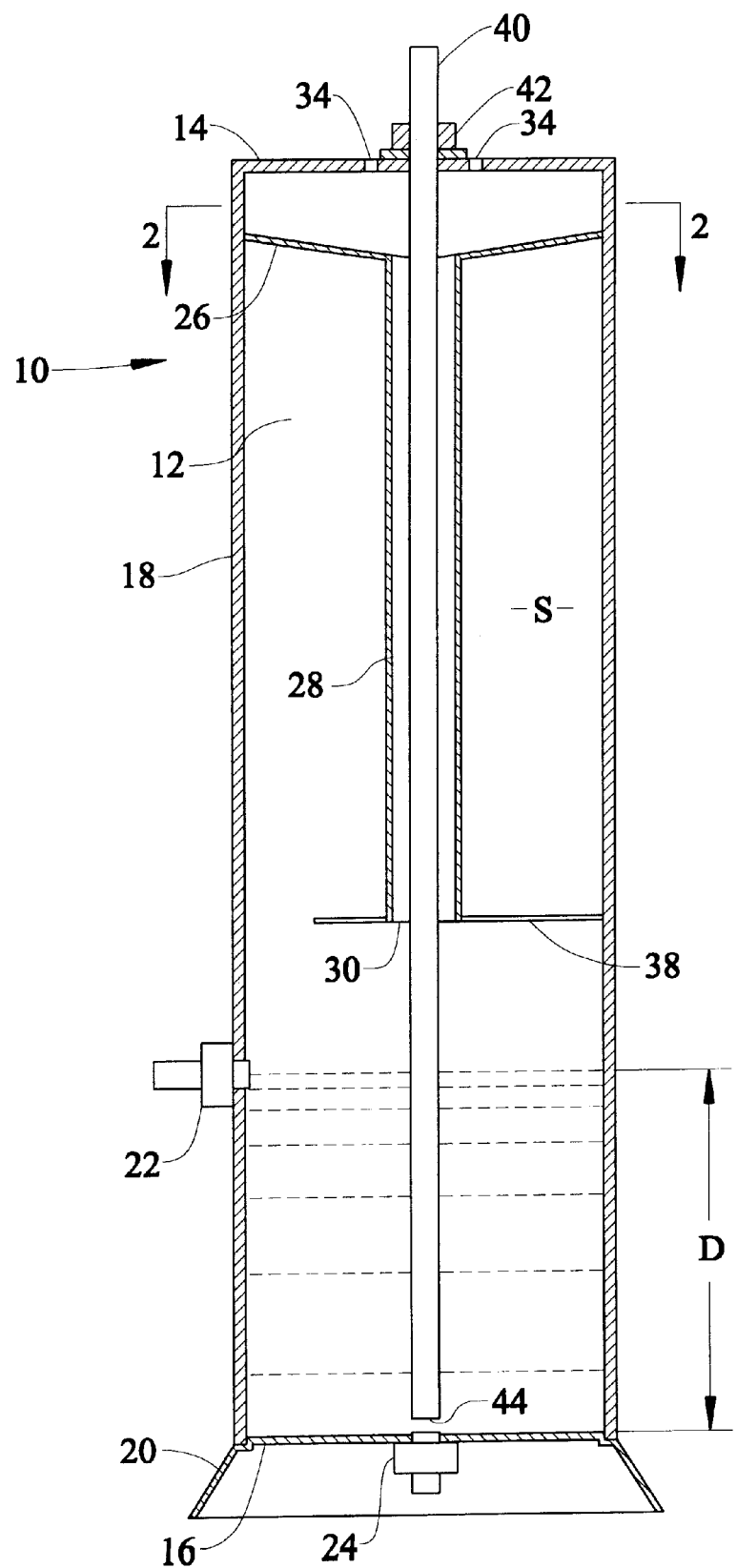
FIG. 1 is a longitudinal cross-sectional view of one embodiment of the invention.
Figure 2:
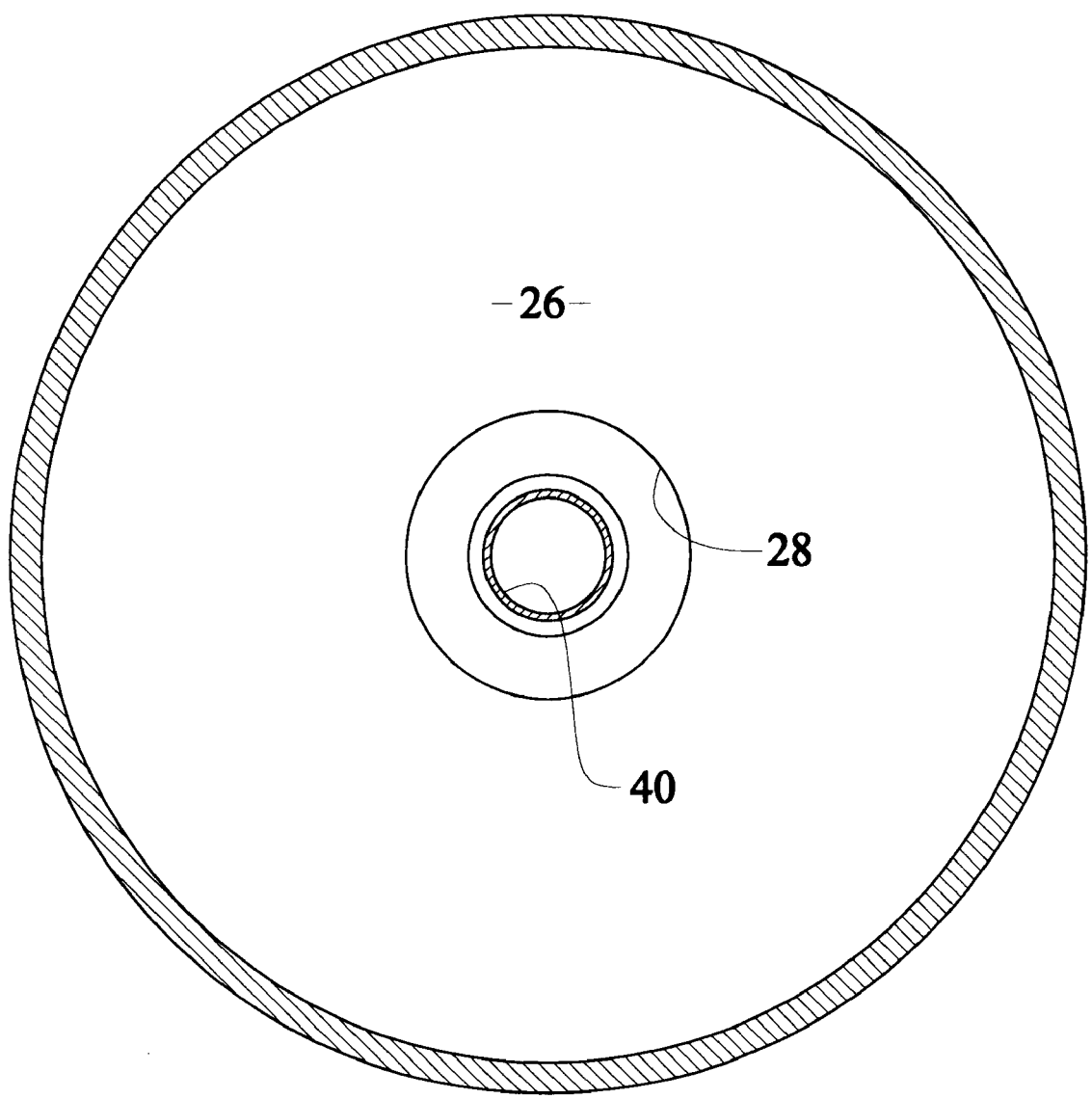
FIG. 2 is a cross-sectional view of the embodiment of FIG. 1 along lines 2—2 of FIG. 1 and viewed in the direction of the arrows.

The back pressure regulating device according to the present invention is generally designated 10 and comprises a housing 12, which is preferably cylindrical and made of stainless steel. Integral top wall 14 and bottom wall 16, together with the sidewall 18, define the housing 12. At the bottom, a stabilizing flange 20 is provided for stabilizing the housing. In the sidewall 18, there is provided a valve fitting 22 which is used to limit the maximum height of liquid in the housing. A similar valve fitting 24 is provided in the bottom wall 16. The valves 22 and 24 may simply be stopcock type valves or other similar fittings which can be easily opened to allow water to flow out of the housing, or closed to retain the water in the housing.

The valve 22 is positioned in the sidewall 18 of the housing 12 spaced upwardly from the bottom wall 16, so that water can be introduced into the housing to a depth D when the valve 22 is open.

Spaced downwardly from the top wall 14 is a spacer wall 26 which serves to position a gas outlet tube 28 within the housing 12. The gas outlet tube 28 is preferably welded to the spacer wall 26 at the top and is open both at the bottom 30 and the top 32. In this manner, gas may flow from within the housing 12 upwardly and outwardly through the tube 28, and through openings 34 in the top 14, above the spacer wall 26.

A spider-type spacer 38 integrally formed with or secured to the side wall 18 serves to position the bottom 30 of gas outlet tube 28 generally concentrically in the housing 12. The gas inlet tube 40 also extends upwardly through the top wall and through a compression gasket fitting 42 which secures the tube 40 in position, yet allows the tube to be adjusted axially through the fitting 42 in order that the bottom end 44 may be moved upwardly or downwardly in the housing, and then secured in place by tightening the fitting 42.

In operation, the valve 22 is opened, and water is poured into the housing 12 through the gas inlet tube 40 until it reaches the depth D and starts to flow out of the valve 22. As discussed above, the depth D is preferably about five inches, which in turn will create a back pressure equal to a maximum of five inches of water. At that time, the valve 22 is closed, retaining the water in place. The top end of the gas inlet tube is then connected to the pipeline to be welded (not shown) in the manner described in my prior patent application, so that the purge gas flowing through the pipe being welded will pass into the gas inlet tube 40, will flow through the tube 40 and bubble up through the water. The space S in the housing 12 above the water level is open through the gas outlet tube 30 and the apertures 34 to the surrounding atmosphere, and thus the space S is also at atmospheric pressure. The purge gas therefor is free to flow into the space S and out through the tube 30 and the apertures 34 where it discharges freely to the atmosphere.

The sizes of the gas outlet tube 30 and the apertures 34 are of course constant, and do not unduly restrict the flow of gas. The only restriction to the flow of the purge gas is the pressure of the water. The amount of this pressure is adjustable from nil up to about five inches of water, depending on the depth to which the gas inlet tube 40 is inserted into the water.

The gas outlet tube extends downwardly from the spacer wall 26 a distance at least about one and one-half times as great as the distance D. In this manner, if the housing 12 is inverted, the water level in the inverted housing will be well below the end 30 of the gas outlet tube 28, preventing water from passing outwardly. When tipped over to a ninety degree or horizontal position, the water level will still be below the height of the gas outlet tube. Moreover, in either case, the gas flow can continue without water being forced out by the purge gas, and pressure cannot increase above five inches. Of course upon tipping or inversion, the pressure will drop to atmospheric.

Figure 3:
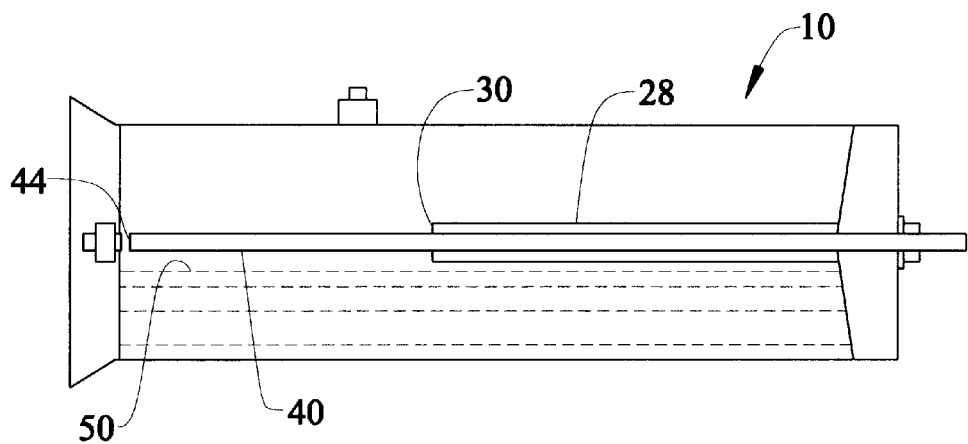
FIG. 3 is a schematic view showing the device tipped over to a horizontal position.

Thus, in the event of an accident in a clean room, which caused the pressure control device to tip over, the water would remain contained in the housing, and contamination of the clean room would be minimized or avoided. Such a condition is shown in FIG. 3, where the device 10 is shown in a horizontal position, and the water level 50 is well below the end 30 of the gas outlet tube 28 or the open end of the gas inlet tube 40.

Figure 4:
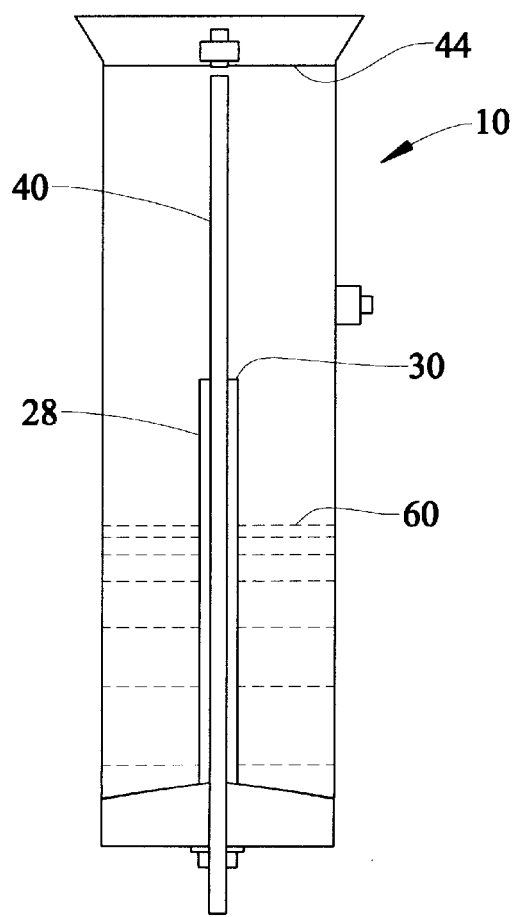
FIG. 4 is a schematic view showing the device completely inverted.

In FIG. 4, the device 10 is shown completely inverted, and the water level 60 is still well below the end 30 of the gas outlet tube 28 and the open end 44 of the gas inlet tube 40. Thus, even when completely inverted, water cannot flow out of the housing. It is important to note that in any of these positions, or even any intermediate positions, gas flow will continue to pass through the housing, although the other benefits of the backpressure control would not exist.

After the welding session is completed, the water may be drained from the upright housing by simply opening the drain valve 24. Since the space S above the water is at atmospheric pressure, nothing further is needed to drain the housing, which occurs by the force of gravity flow.

It will be readily apparent that the device according to the present invention may be constructed of any suitable material such as plastic, steel, stainless steel, aluminum, or the like, although for the purposes of cleanliness in many welding environments, stainless steel will be the preferred material.

While this invention has been described as having certain preferred features and embodiments, it will be understood that it is capable of still further variation and modification without departing from the spirit of the invention, and this application is intended to cover any and all variations, modifications and adaptations as may fall within the spirit of the invention and the scope of the appended claims.

I claim:

1. A backpressure controlling device for welding gas comprising a generally cylindrical housing, a water inlet in the wall of said housing and a water outlet at the bottom of said housing, said water inlet and said water outlet defining a water volume space in said housing, a gas inlet tube and a gas outlet tube, said gas inlet tube having a length such that one end thereof can extend below said water inlet and the other end thereof extending out of said housing for connection to a pipeline carrying purge gas, and said gas outlet tube extending from a space above said water outlet and communicating with the exterior of said housing said housing being of a size such that the volume of the space above said water inlet is at least about one and one-half times as great as said water volume space, whereby when said water volume space is filled with water, said water is unable to flow out of said gas inlet tube or said gas outlet tube at any position of said housing.

2. A backpressure controlling device as in claim 1 and wherein said water inlet and said water outlet comprise valve controlled openings in the walls of said housing.

3. A backpressure controlling device as in claim 2 and wherein said gas inlet tube and said gas outlet tube are concentric.

4. A backpressure controlling device as in claim 3 and wherein said gas inlet tube and said gas outlet tube extend along the longitudinal axis of said generally cylindrical housing.

5. A backpressure controlling device as in claim 4 and wherein said gas inlet tube is adjustably positioned in said housing so that the depth of penetration of the end of said gas inlet tube into said water volume space may be adjusted.

6. A backpressure controlling device as in claim 5 and wherein said housing includes a spacer wall spaced from the top end of said housing for securing said gas outlet tube to said housing and defining a gas outlet space.

7. A backpressure controlling device as in claim 6 and wherein said housing is provided with a plurality of apertures communicating said gas outlet space with the exterior of said housing for release of gas to the exterior of said housing.

8. A backpressure controlling device as in claim 7 and wherein said housing includes a stabilizing flange at the base thereof.

9. A backpressure controlling device for welding gas comprising a vertically oriented cylindrical housing, a first water outlet at the bottom of said housing and a second water outlet in the wall of said housing spaced up from the bottom of said housing, said second water outlet defining the maximum height of a water volume space in said housing, a gas inlet tube and a concentric gas outlet tube surrounding said gas inlet tube, said gas inlet tube being adjustably positioned in said housing and having a length such that one end thereof extends below said water inlet and the other end thereof extending out of said housing for connection to a pipeline carrying purge gas, said gas outlet tube being secured to a spacer wall spaced from the upper end of said housing and extending to a point above said water outlet and communicating with the exterior of said housing through openings in the wall of said housing above said spacer wall, said housing being of a size such that the volume of the space above said water inlet is at least about one and one-half times as great as said water volume space, whereby when said water volume space is filled with water, said water is unable to flow out of said gas inlet tube or said gas outlet tube at any position of said housing.

* * * * *